July 22, 1947.  E. T. DAVIS  2,424,305
CONTROL SYSTEM
Filed Aug. 26, 1944  2 Sheets-Sheet 1

INVENTOR.
ELWOOD T. DAVIS
BY
Virgil E. Woodcock
ATTORNEY.

Patented July 22, 1947

2,424,305

UNITED STATES PATENT OFFICE 2,424,305

CONTROL SYSTEM

Elwood T. Davis, Brookline, Pa., assignor to Leeds and Northrup Company, Philadelphia, Pa., a corporation of Pennsylvania Application August 26, 1944, Serial No. 551,363

19 Claims. (Cl. 257—3)

This invention relates to systems for maintaining the magnitude of a condition, such for example, as temperature, within predetermined limits, and has for an object the provision of a system which will automatically bring into operation means for altering the magnitude of the condition under control in the direction required to maintain it within the predetermined limits.

The invention is particularly suited to control systems where the maintenance of a predetermined temperature may require the control of either a heating agent or a cooling agent.

In carrying out the invention in one form thereof, there is provided a control system for rendering effective, for time intervals dependent upon the extent of departure of a condition from a predetermined magnitude, means for changing the magnitude of the condition in a direction to maintain it at a predetermined value. Whenever one of the magnitude-varying means is ineffective for a predetermined time interval, the system automatically functions to render another magnitude-varying means effective to change the magnitude of said condition in the opposite direction.

More particularly, the invention includes a duration type of control wherein a heating or cooling medium is rendered effective for time intervals dependent upon the required amounts of heating or cooling needed to maintain the temperature at a predetermined magnitude. By means of a measuring network, a control relay is operated from one position to a second position to maintain the temperature at a selected value. The measuring network includes means for intermittently operating the relay to control the heating or cooling operation. As the heating or cooling demand decreases the relay remains in its de-energized position for longer intervals. If the relay remains in its de-energized position for a predetermined time interval, a timer is arranged to reverse the connections to the measuring network and to transfer the control circuits so that there is automatic transfer from heating to cooling, or vice versa.

For a more complete understanding of the invention, reference should be had to the accompanying drawings in which.

It is believed that a clear understanding of the arrangement and operation of the various parts of the system will be best understood from a complete description of the operation of the system as a whole. Therefore, the construction and arrangement of certain of the mechanisms and component parts of the system will be first described in detail.

Figures 1, 2, 3:
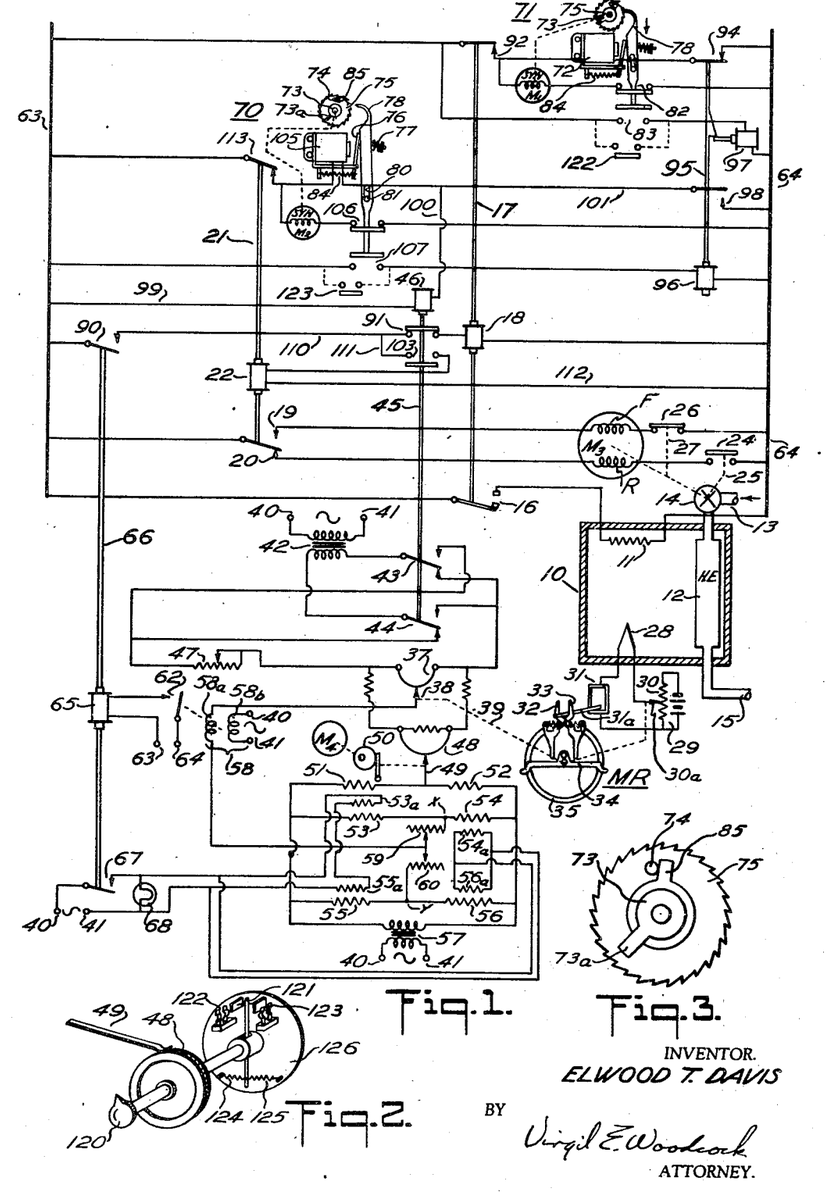
Fig. 1 diagrammatically illustrates a control system embodying the invention.
Fig. 2 diagrammatically illustrates in perspective, a device suitable for use with a modified form of the system of Fig. 1.
Fig. 3 is an enlarged view of the ratchet wheel and associated parts of one of the timers of Fig. 1.

Though the invention is applicable to the control of the magnitude of conditions such as temperature, pressure, ion concentration, pH values, or other physical, chemical or electrical conditions, the invention has been illustrated as applied to the control of temperature within an enclosure, such as a furnace or heat treating chamber 10. The enclosure 10 has suitably mounted therein a heating means shown in the form of an electrical heating resistor 11. A cooling means is illustrated in the form of a heat-exchanger 12 supplied by a cooling fluid from an inlet pipe 13. The flow of the cooling medium is controlled by means of a valve 14 operated by a motor M3. After passage through the heat-exchanger 12, the cooling fluid exits by way of outlet pipe 15. The heating resistor 11 is controlled by the contacts 16 of a contactor 17, provided with an operating coil 18. The motor M3 is provided with forward and reverse windings F and R, the energization of which is under selective control by contacts 19 and 20 of a contactor 21, having an operating coil 22. A limit switch 24 is connected in series with the winding R, and, as indicated by the broken-line 25, it is operated in accordance with the position of the valve 14. The valve is illustrated in its closed position with the limit switch 24 open. A similar switch 26, in series with the winding F, is in its closed position but, as indicated by the broken line 27, it will be operated to its open position when the valve 14 is moved by the motor M3 to its open position.

The temperature within the enclosure 10 is measured by means of a thermocouple 28 connected to a balanceable network 29, of the potentiometer type, and which includes a slidewire 30 and a galvanometer 31. The galvanometer forms a part of a sensitive measuring device of the mechanical relay type. A suitable relay of this type is fully disclosed in Squibb Patent No. 1,935,732, dated November 21, 1933, and includes a pair of feelers 32 and 33 (corresponding with feelers 22 and 22a of said Squibb patent) which serve, after clamping of the pointer 31a of the galvanometer 31, to position a pivoted clutch member 34. By cam members (not shown) a second clutch member 35 is moved in one direction or the other depending upon the sense of the unbalance and by an amount dependent on the extent of the unbalance of galvanometer 31.

If the potential difference of the thermocouple 28 exceeds that of the potentiometer 29, the clutch member 35 is rotated and it in turn adjusts the slidewire 30 relative to its contact 30a in a direction to establish balance between the two potential differences.

The mechanical relay MR also serves to position a slidewire 37 with respect to its contact 38, as indicated by the broken line 39. It will be observed the slidewire 37 forms a part of a balanceable network which is energized from a transformer 42 whose primary winding is connected to a suitable source of alternating current supply as indicated at 40 and 41. The secondary winding of the transformer 42 is connected to the network by means of reversing contacts 43 and 44 of a contactor 45 having an operating coil 46. An adjustable resistor 47, in series with the control slidewire 37, serves to vary the throttling range of the control system; its setting determines the extent to which the network is unbalanced for any given adjustment of the control slidewire 37. This network also includes additional resistors associated with slidewire 37 and a program slidewire 48. These may or may not be included, depending upon the relative ranges of the recorder and the program slidewire.

The temperature of the enclosure 10 is controlled in accordance with a predetermined schedule by means of a program unit including the slidewire 48, and its contact 49 which are relatively adjustable by means of a motor M4 and a suitable adjusting means such as a cam 50. The contact 49, of the slidewire 48, is connected to a second network comprising resistors 51—56. This network is also energized from a suitable source of alternating current supply 40 and 41 by means of a transformer 57.

A balance-detecting device 58 has one winding, 58a, connected to the contact 38 of the control slidewire 37, and to the moveable contacts of a pair of adjustable resistors 59 and 60 which are respectively connected to the point X between resistors 53 and 54 and to the point Y between resistors 55 and 56. The device 58 may be of any suitable type; for example, it may comprise a thermionic detecting means, or as it has been illustrated, it may be in the form of a contact-making electrodynamometer, the other winding 58b of which is connected across the same alternating current supply 40, 41. Whenever an unbalance occurs in one direction, the device 58 operates to close the contacts 62 to complete an energizing circuit from the source of supply 63, 64 for the operating coil 65 of a relay 66. This relay, through its contacts 67, controls from a suitable source of supply, as 40, 41, the energization of heating resistors 53a—56a. The network including the heating coils or resistors 53a—56a is generally similar to networks described in my Patent No. 2,325,232, dated July 27, 1943, particularly Figs. 5 and 6 thereof.

As explained in my said patent, the resistors 53—56 are preferably of nickel or other material having a substantial temperature coefficient. Each of the heating coils 53a—56a is wound on the same form as its associated resistors 53—56. The assemblies 54—54a and 56—56a are designed for a low thermal inertia and correspond with the "proportional action thermal converter assemblies" referred to in my aforesaid patent, while the assemblies 53—53a and 55—55a are of substantially differing thermal inertia and comprise the "droop-corrector thermal converter assemblies" referred to in my aforesaid patent. Whenever the relay 66 is energized, the contacts 67 also complete an energizing circuit for a signal lamp 68.

The control system also includes a pair of timers 70 and 71, of any suitable construction. As shown, these two timers are of identical construction. Therefore, only the principal parts of the timer 70 will be referred to in detail, although certain of the parts of both timers have been identified by the same reference characters. The timer 70 includes a clutch-operating coil 105 and a synchronous motor M2 arranged to drive a dial assembly, including an actuating member 73, Figs. 1 and 3, having a driving projection 73a operable into engagement with a pin or projection 74, carried by a ratchet wheel 75. When the coil 105 is energized, it attracts its armature 76, and through the resilient connection 77 moves a pawl 78 into engagement with the teeth of the ratchet wheel 75. The timer 71 is shown with the coil 72 energized. The pawl 78 holds the ratchet wheel 75 stationary. The synchronous motor M2 then drives the member 73 in a clockwise direction until the projection 73a engages the pin 74. Further rotation of the member 73 produces rotation of the ratchet wheel 75 which drives the pawl 78 downwardly.

It will be observed the pawl 78 is provided with an elongated slot 80 which permits sliding movement thereof relative to a supporting pin 81. This downward movement of the pawl 78 is utilized to operate contacts 106 and 107. Upon de-energization of the coil 105, a spring 84 returns the parts to their de-energized positions; that is, the pawl 78 is not only spaced away from the ratchet wheel 75 but it is also in its upward or original circuit-controlling position. By means of a spring (not shown) the ratchet wheel 75 is biased so that its pin 74 engages a stop 85 which is carried with the shaft upon which the member 73 is mounted. The ratchet wheel 75 is freely mounted on the shaft which carries the actuating member 73. The member 73 may be angularly adjusted on the shaft to vary the position of the driving projection 73a with respect to the pin 74. In this manner, the time required for the motor M2 to move the projection 73a until it engages the pin 74 may be varied to suit desired operating conditions. It is to be further observed timing operations begin only after energization of the clutch coil 105 and operation of pawl 78 into engagement with ratchet wheel 75. This arrests rotation of the wheel 75 and initiates the relative movement between it and the actuating member 73. Though timers of a different type may be used, those known to the art as "Timoflex" synchronous motor-driven reset timers have been found satisfactory.

With the above understanding of certain of the mechanisms and component parts of the system and their organization with respect to each other in the system, it is believed a comprehensive understanding of the invention will be facilitated by a description of the operation of the system as a whole.

As shown, the timer 71 is energized and the motor M1 is moving actuating projection 73a towards the pin 74 carried by the ratchet wheel 75. The relay 95, of the latched-in type, has been shown in its energized position. Though the circuit to its operating coil 96 is open, it is held in its energized position by the latch operated by release or trip coil 97.

It will be assumed that the temperature to which the thermocouple 28 is subjected is lower than that called for by the setting of the program-control slidewire 48. Consequently, a potential difference appears between the points X and Y and the contact 38 of slidewire 37. This potential difference is applied to the detector 58 and is of a polarity such as to close the contacts 62 and thereby to produce energization of the operating coil 65 of the relay 66. The resultant closure of its contacts 67 energizes the signal light 68 and also energizes the heater coils 53a and 55a, connected in series. The contacts 67 also complete an energizing circuit for the heating coils 54a and 56a, connected in parallel. As fully explained in my aforesaid Patent No. 2,325,232, and in my Patent No. 2,300,537 dated November 3, 1942, these heating coils change the resistance of their associated resistors 53—56 so as to impart to the network the characteristics which provide desired control of the temperature within enclosure 10. In brief, since the thermal inertia of assemblies 54—54a and 56—56a materially differ from that of the assemblies 53—53a and 55—55a, the change in the resistance values of the resistors 53—56 will depend upon the length of time their respective heating coils are energized. If the heat load is small (either for heating or cooling) the heating coils will be energized for short time intervals. If the heat load is great these time intervals will be longer. For the shorter time intervals the effect of the assemblies of low thermal inertia predominate and vice versa. When the time intervals of de-energization are long, then the assemblies of high thermal inertia cool more slowly than those of low thermal inertia. As fully explained in my aforesaid patents, the system as a whole responds to the heat load and maintains the desired conditions for light and heavy heat loads.

Upon the aforesaid energization of its operating coil, the relay 66 also closes its contacts 90 to complete an energizing circuit for the operating coil 18 of contactor 17, this circuit being completed through contacts 91 of a polarity-reversing contactor 45. The contactor 17 thereupon closes its contacts 16 to complete an energizing circuit from the supply lines 63 and 64 for the heating resistor 11. At the same time, the contactor 17 opens its contacts 92 to de-energize the clutch-operating coil 72 of the timer 71. As already described, this automatically resets the timer to its initial position. As long as the detector 58 is calling for heat, by maintaining the contacts 62 closed, the timer 71 remains de-energized and at its initial or zero-timing position.

Any one or more of several things may now occur. The heater coils 53a—56a may so change the characteristics of the network, including resistors 53—56, as to balance the network and cause the potential difference at the detector 58 to disappear. On the other hand, the heating resistor 11 may increase the temperature of the enclosure 10 an amount which, through the thermocouple 28 and the mechanical relay MR, may readjust the relative positions of the slidewire 37 and contact 38 so as to balance the network. As a third possibility, the motor M4 may drive the cam 50 and produce sufficient change in the relative setting between the program slidewire 48 and the contact 49 to result in a balance of the network, or disappearance of a potential on the detector 58. Normally, the contacts 62 remain closed for a period of time dependent upon the demand for heat. If the demand is small the contacts 62 remain closed for a relatively short time interval, long enough for one or more of the several above-mentioned factors to produce balance of the network. As soon as the contacts 62 open, the relay 66 is de-energized to open its contacts 67 and 90. The opening of the latter contacts 90, of course, de-energizes the contactor 17 which opens its contacts 16 and closes its contacts 92, again to energize clutch-operating coil 72 of the timer 71. This circuit is completed through closed contacts 94 of the relay 95. If during the operation of the timer 71, a potential difference again appears at the detector 58, the foregoing operations are repeated and the timer 71 is again returned to its initial or zero position.

The appearance of the potential difference may be due to one or more of the following: A change in the resistance of the network due to the cooling of the resistors 53—56, change in the temperature of the enclosure 10, and a change in the setting of the program-control slidewire 48.

During operation where the temperature of the enclosure 10 is relatively high and there are substantial heat losses, the system functions automatically to control the energization of the heating resistor 11 to maintain a temperature within the enclosure 10 which closely follows that determined by the program controller 48. However, as the temperature within the enclosure 10 approaches room temperature the heat requirements become progressively smaller and the control system maintains the contacts 62 open for progressively longer intervals.

For example, if the contacts 62 remain open for a period of five minutes, taken by way of example, the timer 71 "times out"; that is, the operating projection 73a moves against the pin 74 to rotate the ratchet wheel 75, and to produce movement of the pawl 78 to open the contacts 82, and to close the contacts 83. The contacts 82 de-energize the motor M1 and the contacts 83 complete an energizing circuit for the trip coil 97 of the latched-in relay 95. This relay thereupon opens its contacts 94 to de-energize the clutch coil 72 and closes its contacts 98. The effect of the foregoing is to transfer to the timer 70 the subsequent control operations. The closure of contacts 98 also serves to energize the operating coil 46 of the polarity-reversing relay 45. This circuit may be traced from the supply line 63 by conductor 99, operating coil 46, conductors 100 and 101, and by the contacts 98 to the other supply line 64. This relay or reversing contactor thereupon opens its contacts 91 and closes its contacts 103 partially to complete an energizing circuit for the operating coil 22 of relay 21.

At the same time, relay 45 operates reversing contacts 43 and 44 to their energized positions, thereby to reverse the relative polarity of the alternating current applied to the network from the secondary winding of the transformer 42. This reversing operation reverses the operation of the detector 58; that is, if the thermocouple 28 now registers a temperature higher than that desired, the effect on the detector 58 is in a direction tending to close its contacts 62 whereas unbalance in this direction, before the reversing operation, was in a direction tending to open the contacts 62. However, if, upon energization of reversing relay 45, the control system is temporarily in balance, the detector 58 does not close the contacts 62. Nevertheless, the clutch coil 105 of timer 70, and its motor M2 are energized, and after a predetermined time interval, for example five minutes, the timer 70 functions to open its contacts 106 to de-energize the motor M2, and to close its contacts 107 to complete an energizing circuit for the operating coil 96 of the latched-in relay 95. This relay thereupon opens its contacts 98 to de-energize the reversing contactor 45 and closes its contacts 94, again to energize the clutch coil 72 of the timer 71. If the contacts 62 remain open during another predetermined period, for example five minutes, the foregoing operations are again repeated with the automatic establishment of control circuits which upon further operation of the detector contacts 62 will produce the desired heating or cooling. In the absence of closure of the detector contacts, neither the heating agent nor the cooling agent will be made effective although their respective control circuits will in succession be rendered effective for subsequent closure of contacts 62.

Assuming now that there has been a transfer of the control circuits from heating to cooling and that the timer 70 is in operation, and that the detector 58 has operated to close its contacts 62, it will be observed the relay 66 is again operated to its energized position to close its contacts 67 and 90. In this case, the closure of the contacts 90 completes an energizing circuit for the relay 21 which may be traced from the supply line 63, by contacts 90, conductors 110 and 111, contacts 103, operating coil 22 of relay 21, and by conductor 112 to the other supply line 64. Thereupon, the relay 21 opens its contacts 113 to de-energize the motor M2 and the clutch coil 105 of the timer 70. The timer 70 is then reset, that is, the parts return to their original positions. The relay 21 also completes an energizing circuit through its contacts 19 for the forward winding F of the valve-operating motor M3. In consequence, the motor M3 operates the valve 14 to its fully open position, the motor being de-energized by the opening of the limit switch 26 as the valve 14 approaches its open position. As soon as the valve 14 opens, a cooling medium flows from inlet 13 through the heat-exchanger 12, and exits by way of the pipe 15. As the temperature within the enclosure 10 decreases, the thermocouple 28 reflects the change in temperature and the mechanical relay MR changes the setting between the contact 38 and the slidewire 37.

Any one or more of several things may now occur. The heater coils 53a—56a may so change the characteristics of the network including resistors 53—56 as to balance the network, and cause the potential difference at the detector 58 to disappear. On the other hand, the cooling agent and the heat-exchanger 12 may decrease the temperature of the enclosure 10 by an amount which, through a thermocouple 28 and the mechanical relay MR, may readjust the relative positions of the slidewire 37 and the contact 38 so as to balance the network. As a third possibility, the motor M4 may drive the cam 50 to produce sufficient change in the relative setting between the program-slidewire 48 and the contact 49, to result in a balance of the network or disappearance of a potential on the detector 58. Normally, the contacts 62 remain closed for a period of time, dependent upon the demand for cooling. If the demand is small, the contacts 62 remain closed for a relatively short time interval, long enough for one or more of the several above-mentioned factors to produce balance of the network. As soon as the contacts 62 open, the relay 66 is de-energized, and through the opening of its contacts 90 the relay 21 is likewise de-energized. This relay 21 then completes a circuit through its contacts 20 for the reverse winding R of motor M3. The motor M3 thereupon operates to close the valve 14. As it approaches its closed position, the limit switch 24 (closed as the motor was moved to its open position) opens to de-energize the motor M3 with the valve 14 fully closed. The timer 70, by closure of the contacts 113 of relay 21, is energized and begins its timing operation. If the contacts 62 of detector 58 close before the timer 70 "times out," the timer is reset to its initial position and the operations above described are repeated.

In brief summary, it will be seen that the relay 17 controls the operation of the heating agent or medium, while the relay 21 controls the operation of the cooling agent or medium. The latched-in relay 95, together with the associated timers 70 and 71, serve automatically to establish control circuits which upon further operation of the detector contacts 62 will produce the desired heating or cooling. The polarity-reversing contactor 45 not only assists in the transfer of the control circuits, but it also establishes the correct polarity of the network so as to produce closure of the detector contacts 62 to produce time intervals, either of heating or cooling, of duration dependent upon the requirements of the system as a whole.

While the system has been described as fully automatic, it will be understood a semi-automatic system falls within the scope of the invention. For example, the program slidewire 48 may be set by hand, and other features described may be utilized, or omitted, as the particular application of the invention may require. In other words, while preferred embodiments of the invention have been disclosed, it is to be understood that many modifications may be made within the spirit and scope of the invention as set forth in the appended claims.

A preferred form of a manual means for setting the program slidewire 48 is diagrammatically illustrated in Fig. 2. A knob, or adjusting lever 120, is normally retained with its switch arm 121 midway between contacts 122 and 123 by means of a pair of springs 124 and 125. The arrangement is such that when knob 120 is moved in a clockwise direction, the contacts 123 are closed so long as there is relative adjustment between the contact 49 and the slidewire 48. Conversely, when the knob 120 is moved in a counterclockwise direction, contacts 122 are closed. When the knob 120 is released, after completion of the setting of the program slidewire 48, the springs 124 and 125 return the contact arm 121 to a position midway between contacts 122 and 123. This operation is effective for any angular position of slidewire 48 since the disc 126 carrying the contacts 122 and 123 is free to turn independently of rotation of the shaft and knob 120. These contacts 122 and 123, as shown by the broken lines in Fig. 1, are respectively connected in parallel with the contacts 83 of the timer 71, and with the contacts 107 of the timer 70. Functionally, they serve to eliminate any delay in the operation of the system when the control point or desired temperature is shifted so as to require the application of a medium opposite to that which has previously been effective.

More specifically, if the system has been functioning to control the heating resistor 11 and the knob 120 is rotated in a counterclockwise direction to call for a lowered temperature within the enclosure 10, the closure of the contacts 122 immediately produces energization of the releasing or tripping coil 97 of the latched-in relay 95. As above explained, this latched-in relay moves to its de-energized position to bring into operation the cooling medium. Similarly, if the knob 120 is moved in a clockwise direction during a cooling operation, the contacts 123 will complete an energizing circuit for the operating coil 96 of the latched-in relay 95, which thereupon moves to its illustrated position to transfer the operations to the timer 71 and to complete the other circuit changes for controlling the operation of the heating resistor 11.

In both the manual and the automatically controlled systems, the heating or cooling agent by means of an "off" and "on" type of control is so regulated as to meet the demands of the heat load. The temperature within the enclosure 10 is maintained at a predetermined temperature for either a heating or a cooling operation and for all heat loads not exceeding the capacity of the system. Not only is the heating or cooling agent made effective during time intervals which vary in length with the requirements of the heat load, but in case one agent is not utilized for a predetermined time interval the single detecting and measuring system automatically transfers over to the other agent. Thus, while the cooling agent may not be used after the heating agent has been ineffective beyond said predetermined interval, if the detector senses the need for removal of heat from enclosure 10 the cooling agent will be made effective. On the other hand, if neither heating nor cooling is required, the control system automatically establishes control circuits preparatory to a cooling operation followed by the establishment of control circuits preparatory to a heating operation. In this manner, the magnitude of the condition under control may be made greater or smaller depending upon particular predetermined requirements.

The two timers 70 and 71 make possible the provision of transfer from one operation to the other after different inactive periods of the heating or cooling agent. Where the transfer may take place after the same inactive periods for the heating and cooling agents the system of Fig. 4 may be utilized.

Figure 4:
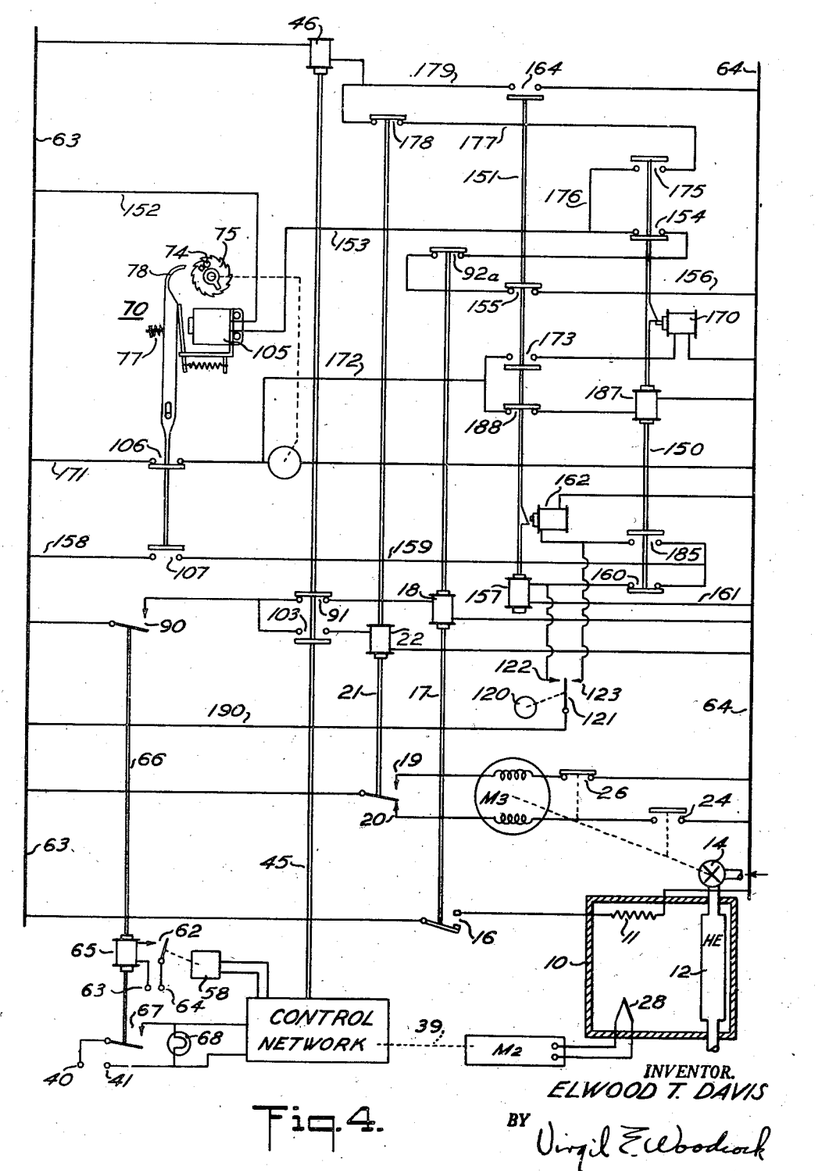
Fig. 4 diagrammatically illustrates a modified form of a part of the control system of Fig. 1.

By a novel arrangement of the circuits the single timer 70 may be utilized to provide automatic transfer from heating to cooling and from cooling to heating. In many respects the system of Fig. 4 is similar to that of Fig. 1. However, two relays 150 and 151, of the latched-in type, are provided in the system of Fig. 4. Corresponding parts have been given like reference numerals, and the control network, the mechanical relay MR, and the detector 58 have been indicated symbolically by rectangles.

In describing the operation of the system of Fig. 4 it will be assumed that the system has been functioning to add heat to the enclosure 10. The relays have been illustrated in positions for this operation. It will be observed that as long as the contacts 99 of the relay 65 close intermittently, the contactor 17 will be periodically energized to control the heating resistor 11. As before, the periodic openings of the contacts 92a of the contactor 17 intermittently de-energize the clutch coil 105 of the timer 70. This de-energization of coil 105 operates to reset the timer. This energizing circuit may be traced from supply line 63, by conductor 152, clutch coil 105, conductor 153, contacts 154 of relay 150, contacts 92a, contacts 155 of relay 151, and by conductor 156 to the other supply line 64. If the contacts 90 of the relay 66 do not close within the time-period determined by the setting of the timer 70, this timer will complete its cycle and will open its contacts 106 and simultaneously close its contacts 107. The closing of the contacts 107 completes an energizing circuit for the operating coil 157 of the latched-in relay 151, through a circuit which may be traced from the supply line 63 by conductor 158, contacts 107, conductor 159, contacts 160 of latched-in relay 150, the operating coil 157, and by conductor 161 to the other supply line 64. The relay 151 is thereupon operated to its latched-in position, in which position it is restrained by a suitable latch operating under the control of a release or tripping coil 162. With relay 151 in its energized position, an energizing circuit is completed through its contacts 164 for the operating coil 46 of relay 45, this circuit being obvious from an inspection of the drawing. The relay 45 is provided with the polarity-reversing contacts 43 and 44 (not shown in Fig. 4) to reverse the control action of the "control network."

As in Fig. 1, the opening of the contacts 91 and the closing of the contacts 103 of relay 45 transfer the control impulses, produced by the contacts 90 of relay 66, from the operating coil 18 of the heating contactor 17 to the operating coil 22 of the cooling contactor 21. The opening of the contacts 155 of relay 151 interrupts the circuit of the timer-clutch coil 105. This resets the timer with the resultant closing of its contacts 106 and the simultaneous opening of its contacts 107. An energizing circuit is thereby completed for the trip coil 170 of the latched-in relay 150, which circuit may be traced from the supply line 63, from the conductor 171, contacts 106, conductor 172, contacts 173 of relay 151, and by the trip coil 170 to the other supply line 64. Thereupon, the relay 150 moves to its unlatched or its de-energized position. The resultant closure of its contacts 175 completes an energizing circuit for the timer-clutch coil 105, which circuit may be traced from the supply line 63 by conductor 152, clutch coil 105, conductors 153 and 176, contacts 175, conductor 177, contacts 178 of contactor 21, conductor 179, and by contacts 164 of relay 151 to the other supply line 64. With this energizing circuit established for the clutch coil 105 it will be understood that whenever the relay contacts 90 of the relay 66 are open the contactor 21 will be de-energized and its contacts 178 will be closed. On the other hand, whenever the contacts 90 are closed the contacts 178 will be open to de-energize the clutch coil 105 to reset the timer. The timer will be reset each time a cooling impulse is delivered as a result of the energization of the contactor 21. As described in connection with Fig. 1, the motor M3 operates under the control of the contactor 21 to open and close the valve 14, thereby to regulate the time of flow of the cooling agent through the heat-exchanger 12.

If the contacts 90 of relay 66 remain open for a time interval greater than that established by the setting of the timer 70, circuits are re-established preparatory to the addition of heat to the enclosure 10. More specifically, after this time interval expires, the timer 70 operates to open its contacts 106 and simultaneously to close its contacts 107. The closing of the contacts 107 now completes a circuit for the tripping coil 162 of relay 151. This circuit may be traced from the supply line 63 by conductor 158, contacts 107, conductor 159, contacts 185 of relay 150, and by the tripping coil 162 of the other supply line 64. The relay 150 is therefore unlatched and operates to its de-energized position. In its unlatched or de-energized position its contacts 164 open to de-energize the reversing relay 45. The operation of the relay 45 to its de-energized position again operates its contacts 43 and 44 (shown only in Fig. 1) to reverse the polarity on the "control network." This establishes the correct operation for the control of the heating of the enclosure 10. The opening of the contacts 103 and the closing of the contacts 91 of relay 45 complete a circuit for the impulses for the contacts 90 of relay 66, by way of the operating coil 18 of the heating contactor 17.

It will be observed that the opening of the contacts 164 of relay 151 de-energizes the timer-clutch coil 105. This resets the timer and results in the closure of its contacts 106 and the opening of its contacts 107. Consequently, there is completed through the contacts 106 an energizing circuit for the operating coil 187 of the latched-in relay 150. This circuit may be traced from the supply line 63 by conductor 171, contacts 106, conductor 172, contacts 188 of relay 151, and by the operating coil 187 to the other supply line 64. The latched-in relay 150 thereupon goes to its energized or latched-in position, as shown in the drawing. The closure of its contacts 154 again serves to energize the timer-clutch coil 105 through the circuit previously traced. The closure of the contacts 160 of the relay 150 partially completes the energizing circuit for the operating coil 157 of relay 151, so that upon subsequent closure of the timer contacts 107 the relay 151 will be energized, as previously described. This will, of course, initiate the return of the system to a condition preparatory to operation of the motor M3 for the cooling of the enclosure 10. The actual operation of either the heating agent or the cooling agent depends upon the need for such agent, as reflected by the detector 58, which of course controls the operation of the relay 66.

It will be also observed that the knob 120, which, it will be recalled, operates the program slidewire 48 relative to its contact 49, is effective to complete a circuit through its associated contacts 122 and 123. If the knob 120 is turned in a direction to require a cooling of the enclosure 10, a circuit is at that time completed for the operating coil 157 of the latched-in relay 151. This circuit may be traced from the supply line 63 by conductor 190, contacts 121—122, the operating coil 157 and by conductor 161 to the other supply line 64. This initiates immediately the transfer of the circuits for a cooling operation. In the even the cooling agent is to be made effective, the relay 66 will close its contacts 90 to energize the contactor 21 in manner already described.

On the other hand, if the system is operating to cool the enclosure 10, and it is desired to add heat to the enclosure, the knob 120 will be rotated in an opposite direction to energize the tripping coil 162 of relay 151. This will, of course, re-establish the circuits for the heating operation under the control of the relay 66. It will be recalled that only momentary contact is established between the movable contact arm 121 and one or the other of contacts 122 and 123.

What is claimed is:

1. A system of maintaining the magnitude of a condition within predetermined limits, a first means for producing a change in the magnitude of said condition in one direction, a second means for producing a change in the magnitude of said condition in the opposite direction, detecting means responsive to the departure beyond one of said limits of the magnitude of said condition for rendering said first means effective for variable time intervals until the magnitude of said condition is returned to within said limits, means including a timer for placing said second means under the control of said detecting means when the magnitude of said condition remains within said limits for a predetermined time interval.

2. Means for controlling a heating medium and a cooling medium to produce a predetermined controlled temperature comprising a first means for rendering said heating medium effective for variable time intervals to increase said temperature, a second means for rendering effective said cooling medium for variable time intervals to decrease said temperature, detecting means responsive to the magnitude of said temperature for controlling the operation of one of said first and said second means, means operable whenever one of said first and second means is ineffective for a predetermined time interval to change said temperature for placing the other one of said means under the control of said detecting means, and means for establishing a program of temperature control which requires that said heating and cooling mediums be made effective.

3. A control system for a heating means and a cooling means comprising a control relay, temperature sensitive means for closing said relay, means including a timer operable under the control of said relay for rendering effective said heating means, said timer having a circuit-controlling means which upon opening of said relay for a predetermined period is operated by said timer, means including said circuit-controlling means for establishing control of said cooling means by said relay, and means operable upon opening of said relay for a predetermined time for re-establishing control of said heating means by said relay.

4. A control system for a heating means and a cooling means comprising a control relay, temperature sensitive means for closing said relay, means including a timer operable under the control of said relay for rendering effective said heating means, said timer having a circuit-controlling means which upon opening of said relay for a predetermined period is operated by said timer, means including said circuit-controlling means for establishing control of said cooling means by said relay, and means including a second timer operable upon opening of said relay for a predetermined time for re-establishing control of said heating means by said relay.

5. A control system for a heating means and a cooling means comprising a control relay, temperature sensitive means for closing said relay, means including a timer operable under the control of said relay for rendering effective said heating means, said timer having a circuit-controlling means for establishing control of said cooling means by said relay, and means including said timer operable upon opening of said relay for a predetermined time for re-establishing control of said heating means by said relay.

6. A control system for maintaining the magnitude of a condition within predetermined limits comprising separate means for varying in opposite directions the magnitude of said condition, a control relay, condition-responsive means for closing said relay, a timer, means operable under the control of said relay for rendering effective one of said separate means, said timer upon opening of said relay for a predetermined period operating from one position to a second position, means including said timer for rendering said relay effective to control the other of said separate means and for producing closure of said relay when the magnitude of said condition is above a predetermined value, and means operable upon opening of said relay for a predetermined time for re-establishing control of the first of said separate means by said relay.

7. A control system for maintaining the magnitude of a condition within predetermined limits comprising separate means for varying in opposite directions the magnitude of said condition, a control relay, condition-responsive means for closing said relay, a timer, means operable under the control of said relay for rendering effective one of said separate means, said timer upon opening of said relay for a predetermined period operating from one position to a second position, means including said timer for rendering said relay effective to control the other of said separate means and for producing closure of said relay when the magnitude of said condition is above a predetermined value, and means including a second timer operable upon opening of said relay for a predetermined time for re-establishing control of the first of said separate means by said relay.

8. A control system for maintaining the magnitude of a condition within predetermined limits comprising separate means for varying in opposite directions the magnitude of said condition, a control relay, condition-responsive means for closing said relay, a timer, means operable under the control of said relay for rendering effective one of said separate means, said timer upon opening of said relay for a predetermined period operating from one position to a second position, means including said timer for rendering said relay effective to control the other of said separate means and for producing closure of said relay when the magnitude of said condition is above a predetermined value, and means including said timer operable upon opening of said relay for a predetermined time for re-establishing control of the first of said separate means by said relay.

9. A control system for maintaining the magnitude of a condition within predetermined limits comprising separate means for varying in opposite directions the magnitude of said condition, a control relay, condition-responsive means for closing said relay, a timer, means operable under the control of said relay for rendering effective one of said separate means, said timer upon opening of said relay for a predetermined period operating from one position to a second position, means for returning said timer to its first position whenever said relay closes before expiration of said predetermined period, means operable upon movement of said timer to its second position for rendering said relay effective to control the other of said separate means and for producing a closure of said relay, and means operable upon opening of said relay for a predetermined time for re-establishing control by said relay of said one of said separate means.

10. A control system for maintaining the magnitude of a condition within predetermined limits comprising separate means for varying in opposite directions the magnitude of said condition, a control relay, condition-responsive means for closing said relay, a timer, means operable under the control of said relay for rendering effective one of said separate means, said timer upon opening of said relay for a predetermined period operating from one position to a second position, means for returning said timer to its first position whenever said relay closes before expiration of said predetermined period, means operable upon movement of said timer to its second position for rendering said relay effective to control the other of said separate means and for producing closure of said relay, and means including a second timer operable upon opening of said relay for a predetermined time for re-establishing control by said relay of said one of said separate means.

11. A control system for maintaining the magnitude of a condition within predetermined limits comprising separate means for varying in opposite directions the magnitude of said condition, a control relay, condition-responsive means for closing said relay, a timer, means operable under the control of said relay for rendering effective one of said separate means, said timer upon opening of said relay for a predetermined period operating from one position to a second position, means for returning said timer to its first position whenever said relay closes before expiration of said predetermined period, means operable upon movement of said timer to its second position for rendering said relay effective to control the other of said separate means and for producing closure of said relay, and means including said timer operable upon opening of said relay for a predetermined time for re-establishing control by said relay of said one of said separate means.

12. A control system for maintaining the magnitude of a condition within predetermined limits comprising separate means for varying in opposite directions the magnitude of said condition, a pair of contactors for independently rendering said separate means effective and ineffective, a balanceable network, means for unbalancing said network in accordance with the extent of departure of said condition from a predetermined value, means including a detector of unbalance in said network for controlling the energization of said contactors, means including a pair of timers for establishing energizing circuits to one of said contactors, means including said detector for resetting of one of said timers so long as said one contactor within a predetermined time interval renders its associated means effective, means responsive to operation of said one timer for placing the other of said contactors under the control of said detecting means, and means responsive to the operation of the other of said timers for placing the other of said contactors under the control of said detecting means.

13. The combination as set forth in claim 12 in which said network includes a program-controlling means, means for adjusting said program-controlling means to produce a predetermined change in the magnitude of said condition, and means operable by said program-adjusting means for immediately transferring operation from one contactor to the other contactor.

14. The combination with a balanceable network arranged to be unbalanced by variation in the magnitude of a condition from a predetermined value, the combination of polarity-changing means for producing an unbalance of said network in the same direction when the magnitude of said condition is above and below its said predetermined value, means for detecting said unbalance in said network, separate means for respectively increasing and decreasing the magnitude of said condition, means including a timer and said detecting means for selectively operating one of said condition-changing means to change the magnitude of said condition until unbalance of said network in one direction disappears for a predetermined time interval, and means operable under the control of said timer and after expiration of said time interval for operating said polarity-changing means and for rendering effective under the control of said detecting means the other of said condition-changing means to change the magnitude of said condition in the opposite direction.

15. A control system for maintaining the magnitude of a condition within predetermined limits comprising separate means for varying in opposite directions the magnitude of said condition, a pair of contactors for independently rendering said separate means effective and ineffective, a balanceable network, means for unbalancing said network in accordance with the extent of departure of said condition from a predetermined value, means including a detector of unbalance in said network for controlling the energization of said contactors, timing means, means including said timing means for establishing an energizing circuit to one of said contactors, means operable under the control of said detector for resetting said timing means so long as said one contactor within a predetermined time interval renders its associated means effective, means responsive to operation of said timing means for placing the other of said contactors under the control of said detecting means, and means responsive to a subsequent operation of said timing means for again placing said one of said contactors under the control of said detecting means.

16. The combination set forth in claim 15 in which said network includes a program-controlling means, means for adjusting said program-controlling means to produce a predetermined change in the magnitude of said condition, and means operable by said program-adjusting means for immediately transferring operation from one contactor to the other contactor.

17. The combination with a balanceable network arranged to be unbalanced when the magnitude of a condition departs from a predetermined value, a polarity-changing means for said network for producing unbalance in the same direction when the magnitude of said condition is above or below said predetermined value, a relay operable from a first to a second position in response to unbalance in said network, means for modifying the action of said network to produce a balance thereof and to produce repeated operation of said relay as the magnitude of said condition approaches said predetermined value, said polarity-changing means having transfer contacts for the control respectively of said condition-changing means, means including a latched-in relay for controlling said polarity-changing means, said latched-in relay having an operating coil and a tripping coil, a pair of timers respectively controlling the energization of said tripping coil and of said operating coil, separate means for respectively rendering effective one or the other of said timers to time the operation when one or the other of said condition-changing means is ineffective, each said timer operating after a predetermined time interval to transfer operation from one condition-changing means to the other condition-changing means.

18. The combination with separate means for varying in opposite directions the magnitude of a condition, of a controller having off and on positions, means including a detector responsive to changes in the magnitude of said condition for operating said controller to its on position for variable periods of time, selective means for placing one or the other of said separate means under control of said controller, and timing means operable when said controller is in its off position for a predetermined time interval for transferring said controller from one to the other of said separate means.

19. The combination with a balanceable network arranged to be unbalanced by variation in the magnitude of a condition from a predetermined value, of means for detecting said unbalance in said network, separate means for respectively increasing and decreasing the magnitude of said condition, means including a timer and said detecting means for selectively operating one of said condition-changing means to change the magnitude of said condition until unbalance of said network in one direction disappears for a predetermined time interval, and means operable under the control of said timer and after expiration of said time interval for rendering effective under control of said detecting means the other of said condition-changing means to change the magnitude of said condition in the opposite direction.

ELWOOD T. DAVIS.

REFERENCES CITED

The following references are of record in the file of this patent:

UNITED STATES PATENTS

| Number | Name | Date |
| --- | --- | --- |
| 2,161,847 | Blodgett | June 13, 1939 |
| 2,196,687 | Steinfeld | Apr. 9, 1940 |
| 1,951,396 | Corbett | Mar. 20, 1934 |
| 2,006,306 | Wile | June 25, 1935 |
| 2,202,731 | Crago | May 28, 1940 |

Certificate of Correction

Patent No. 2,424,305.

July 22, 1947.

ELWOOD T. DAVIS

It is hereby certified that error appears in the printed specification of the above numbered patent requiring correction as follows: Column 11, line 64, for the word "even" read *event*; and that the said Letters Patent should be read with this correction therein that the same may conform to the record of the case in the Patent Office.

Signed and sealed this 22nd day of June, A. D. 1948.

[SEAL]

THOMAS F. MURPHY,
*Assistant Commissioner of Patents.*